United States Patent [19]

Oxley

[11] Patent Number: 4,647,883

[45] Date of Patent: Mar. 3, 1987

[54] TUNING SCREW HAVING A RESILIENT PLASTICS BUSH WHICH SUPPORTS THE TUNING PLUNGER WITHIN A METAL BUSH

[76] Inventor: Robert F. Oxley, 89a Route de Florissant, 1206 Geneva, Switzerland

[21] Appl. No.: 644,688

[22] Filed: Aug. 27, 1984

[30] Foreign Application Priority Data

Aug. 27, 1983 [GB] United Kingdom ............... 8323143

[51] Int. Cl.⁴ ............................................. H03J 3/22
[52] U.S. Cl. ................................. 333/245; 333/232; 333/263; 333/99 R; 411/378; 411/366; 411/91; 411/113
[58] Field of Search .................. 361/295, 296; 334/78, 334/41, 45; 333/232, 231, 226, 224, 235, 263, 245, 99 R; 411/366, 378, 431, 427, 81, 83, 91, 103-105, 111-113, 255

[56] References Cited

U.S. PATENT DOCUMENTS

| 2,666,334 | 1/1954 | Nalle | 411/366 X |
| 3,252,115 | 5/1966 | Gordon | 333/232 |
| 3,618,135 | 11/1971 | Weller | 333/232 |
| 3,885,239 | 5/1975 | Zaleski | 333/232 |
| 4,035,749 | 7/1977 | Slocum et al. | 333/232 |

FOREIGN PATENT DOCUMENTS 810327 3/1959 United Kingdom ............... 333/232

Primary Examiner—Eugene R. Laroche
Assistant Examiner—Benny Lee
Attorney, Agent, or Firm—Staas & Halsey

[57] ABSTRACT

A microwave tuning device including a cylindrical metal bush having an internal screw thread. A metal rod-like plunger is axially displaceable within the plastics bush. A plastics bush is fitted over one end of the plunger and fixed thereto by means of splines and grooves. The bush is inserted into the internal screw thread so as to form a corresponding mating screw thread on its outer periphery. A plurality of fingers extend from one end of the metal bush and resiliently engage the outer periphery of a plain portion of the plunger so as to provide resistance to unintentional rotation of the plunger in the metal bush and electrical interconnection therebetween.

8 Claims, 6 Drawing Figures

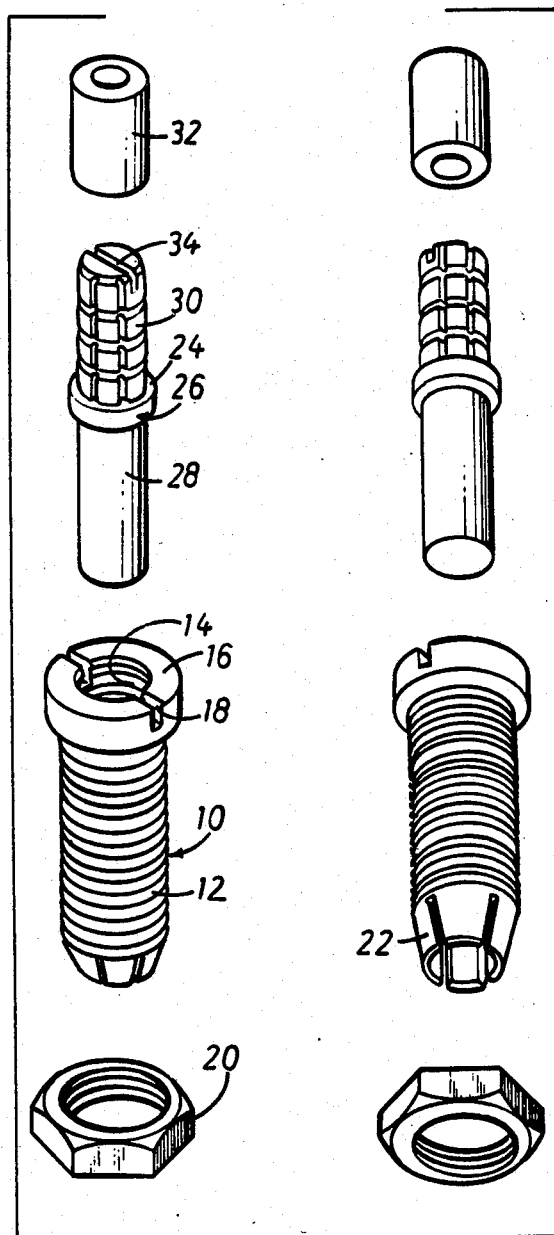
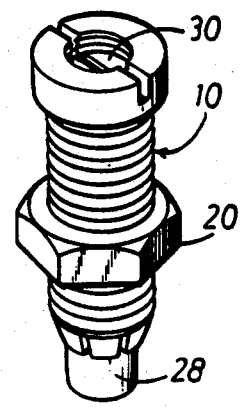
Fig 3
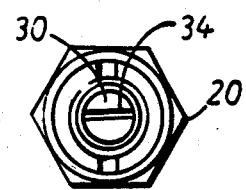
Fig 4
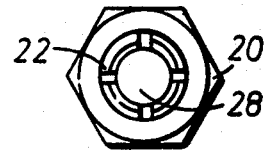
Fig 5
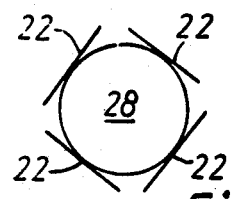
Fig 6
Fig 1    Fig 2

4,647,883

TUNING SCREW HAVING A RESILIENT PLASTICS BUSH WHICH SUPPORTS THE TUNING PLUNGER WITHIN A METAL BUSH

BACKGROUND OF THE INVENTION

Field of the Invention

The present invention is concerned with tuning screws, particularly for use in microwave tuning devices where it is required to enable a tuning plunger or slug to be selectively inserted into a microwave cavity to a variable extent for correspondingly varying the reactance of the cavity.

A known tuning device (see U.S. Pat. No. Re. 30,406) comprises an externally screw threaded, electrically conductive rod which is received within an internally screw threaded electrically conductive sleeve. The threaded portion of the rod is formed with a pair of parallel, flat bottomed slots of equal depth which extend radially inwardly from diametrically opposite sides of the rod. The depth of these slots is substantially greater than the radius of the rod. The provision of the slots provides the rod with a certain amount of axial resilience which, when the rod is inserted in the sleeve in a compressed state so as to resiliently misalign the threads on the rod and sleeve, the resulting permanent deformation of the rod in the region of the slots causes an axially directed gripping force between the mating threads which serves to resist unintentional rotation of the rod.

One problem with this known device is that the torque which resists unintentional rotation of the rod within the sleeve is generated by the co-operating metal screw threads which inter-engage with a degree of mutual interference. Such an arrangement is inherently liable to generate loose metallic particles (swarf) in the joint. Since this inter-engagement of the screw threads also provides the necessary electrical connection between the rod and the sleeve, the presence of such swarf particles in the joint can cause electrical noise and other spurious effects in the waveguide system.

It is an object of the present invention to provide a tuning device in which the latter problem is mitigated.

In accordance with the present invention, there is provided a microwave tuning device having a cylindrical metal bush having an internal screw-thread, a metal, rod-like plunger received within the bore in the cylindrical metal bush so as to be axially displaceable therein, a bush of resilient plastics material disposed coaxially about a portion of the plunger adjacent one end thereof, the plastics bush being inserted into the internal screw-thread of the cylindrical metal bush thereby form the corresponding mating screw-thread on the plastics bush, and a plurality of fingers disposed on one end of the cylindrical metal bush, the fingers resiliently engaging the end opposite the one of the plunger to provide resistance to unintentional rotation of the plunger in the metal bush and electrical interconnection therebetween.

Preferably, the plastics bush is formed of P.T.F.E. and is fixed rigidly to the plunger by means of a plurality of splines and grooves formed on the outer periphery of the plunger.

The invention is described further hereinafter, by way of example only, with reference to the accompanying drawings, wherein:

BRIEF DESCRIPTION OF THE DRAWINGS

FIG. 1 is a perspective exploded view from above of one embodiment of a tuning device in accordance with the present invention;

FIG. 2 is a perspective exploded view of the device from below;

FIG. 3 is a perspective view of the device when assembled;

FIG. 4 is a top plan view;

FIG. 5 is a bottom plan view; and

FIG. 6 is a highly diagrammatic end view of a modified embodiment.

DESCRIPTION OF THE PREFERRED EMBODIMENT

The illustrated device (FIGS. 1 to 5) comprises a conductive metal sleeve or bush 10 which is externally screw-threaded at 12 and internally screw threaded at 14. One end of the bush 10 is formed with an annular shoulder 16 having slots 18 for enabling the sleeve to be inserted into a housing (not shown) by means of a screw-driver blade. The outer threads 12 carry a locknut 20. The other end of the bush 10 is formed with a plurality (four in this instance) of collet-like fingers 22 (see FIG. 2) which extend slightly inwardly relative to the remainder of the bush bore.

The device also includes a conductive metal plunger 24 having an approximately centrally disposed shoulder 26 which separates a plain end portion 28 from a splined and grooved portion 30. The plain, smooth portion 28 has a diameter slightly less than that of the screw-threaded bush bore but such that it is engaged by the collet-like fingers 22 with a light but positive interference fit therebetween. The splined and grooved portion 30 has a P.T.F.E. bush 32 pushed over it and contains in its free end a screw-driver slot 34. The form of the splines and grooves can be that described in our U.K. Pat. No. 1060271 in order to prevent relative rotation of the bush 32 on the plunger 24.

The resilient bush 32 is inserted into the screw threaded bush 10 so as to make its own thread on the internal threads 14 of the outer bush 10 and thereby enable the axial position of the plunger 24 to be adjusted within the outer bush 10 by rotating the plunger using a suitable blade in the slot 34. The torque which resists unintentional rotation of the plunger is provided mainly by the engagement of the collet-like fingers on the plunger portion 28, the friction between the P.T.F.E. bush 32 and the mating threads in the bush 10 being relatively low.

There is thus no question of metal wear particles being generated at the interface between the P.T.F.E. bush 32 and the bush 10. Furthermore, the likelihood of metal wear particle generation at the collet/plunger interface is very much lower than in the case of the known interfering metal screw-threads so that the generation of noise is correspondingly much lower. This can be minimised further if the collet fingers 22 are formed as flat plates which effectively make tangential point or line contact as indicated highly diagrammatically in FIG. 6.

The P.T.F.E. bush, being resilient, takes up any backlash and tolerances in the bush threads. Loaded P.T.F.E, for example with graphite, may be used as it is itself dimensionally more stable and has a lower thermal expansion coefficient than unloaded P.T.F.E. Graphite loading can be particularly advantageous in some cases as it provides a conductive resilient P.T.F.E. which would act as an effective electromagnetic interference seal or gasket to prevent microwave energy "leaking" from the waveguide through the tuning device.

It will be noted that the plunger is supported at two distinct "points" along its length, firstly by the collet fingers 22 and secondly by the engagement of the P.T.F.E. bush with the outer bush 10. This enables the coaxial alignment of the plunger within the bush to be more effectively ensured than, for example, in the case of the single "point" support of the known device described originally. The present device is therefore inherently more stable in this respect.

In other embodiments, the collet fingers 22 can be designed so as to have an S-shaped configuration (when viewed in longitudinal section) so as to have better compliance in the radial direction.

It will be noted that the central shoulder 26 on the plunger acts as an end stop in that it engages the collet fingers (or an internal stop within the bush 10—not shown) to prevent the plunger from being screwed right through the bush 10. This is very important in practice as considerable inconvenience can be caused if the plunger is permitted to fall into the wave guide during tuning.

By using the collet to provide the electrical contact to the plunger 26, a much shorter path to earth (via the outer bush 10) results compared to the known device, with a more consistent resistance to effect an advantageously lower self inductance and more reliable performance.

Good contact between the inside of the collet and the outside surface of the plunger may be obtained by arranging for the internal collet diameter to be initially slightly greater than the outside diameter of the plunger. The collet is then "set" inwards so that the plunger makes resilient interference contact at four points as shown in FIG. 6 (one at each sector of the collet), these points being inherently smooth, thereby minimising wear.

I claim:
1. A microwave tuning device, comprising:
   (a) a cylindrical metal bush having a longitudinal bore, an external screw thread on the outside of the cylindrical metal bush and an internal screw thread on the wall of said bore;
   (b) a rod-like metal plunger which is received within the bore of the cylindrical metal bush so as to be axially displaceable therewithin;
   (c) a bush of resilient plastics material disposed coaxially about a portion of a first end of the plunger, said plastics bush being inserted into said internal screw-thread at a first end of the cylindrical metal bush whereby to form a corresponding mating screw-thread on the plastics bush; and
   (d) a plurality of fingers disposed on the second end of said cylindrical metal bush, said fingers resiliently engaging the second end of said plunger to provide resistance to unintentional rotation of the plunger in the metal bush and direct electrical interconnection between the second end of the plunger and the second end of the metal bush.

2. A microwave tuning device according to claim 1, wherein the plastics bush is fixed rigidly to the plunger by means of a plurality of splines and grooves formed on the outer periphery of said first end of the plunger.

3. A microwave tuning device according to claim 2, wherein the second end of the plunger is smooth and wherein there is formed a shoulder on the plunger between the portion thereof which is smooth and the portion which contains the splines and grooves, said shoulder serving to limit the extent to which the plunger can be inserted into the cylindrical metal bush by engagement at the shoulder with said fingers in one extreme position of the plunger.

4. A microwave tuning device according to claim 1, wherein the plastics bush is formed of P.T.F.E.

5. A microwave tuning device according to claim 1, wherein the plastics bush is formed of P.T.F.E. loaded with graphite.

6. A microwave tuning device according to claim 1, wherein the tips of the fingers define arcuate edges and wherein the plunger is engaged by said arcuate edges of the fingers along a circumferentially extending line on the plunger.

7. A microwave tuning device according to claim 1, wherein the fingers make substantially point contact with the periphery of said second end of the plunger.

8. A microwave tuning device, comprising:
   (a) a cylindrical metal bush having a longitudinal bore, an external screw thread on the outside of the cylindrical metal bush and an internal screw thread on the wall of said bore;
   (b) a rod-like metal plunger which is received within said bore of the cylindrical metal bush so as to be axially displaceable therewithin;
   (c) a bush of resilient plastics material disposed coaxially about a portion of a first end of the plunger, said plastics bush being inserted into said internal screw-thread at a first end of the cylindrical metal bush whereby to form a corresponding mating screw thread on the plastics bush; and
   (d) a plurality of collet-like fingers disposed on the second end of said cylindrical metal bush, said fingers extending inwardly relative to the bore of the metal bush and being in engagement with the second end of the plunger to provide resistance to unintentional rotation of the plunger in the metal bush and direct electrical interconnection between the second end of the plunger and the second end of the metal bush.

* * * * *